United States Patent [19]

Familetti et al.

[11] Patent Number: 4,833,594

[45] Date of Patent: May 23, 1989

[54] METHOD OF TAILORING AN OPERATING SYSTEM

[75] Inventors: Harry G. Familetti, Fishkill; Charles W. Lickel, Poughkeepsie; Ross A. Mauri, Poughkeepsie; Mark E. Swallow, Poughkeepsie; Janis L. Coltin, Poughkeepsie, all of N.Y.

[73] Assignee: International Business Machines, Armonk, N.Y.

[21] Appl. No.: 945,148

[22] Filed: Dec. 22, 1986

[51] Int. Cl.[4] .................................................. G06F 9/00
[52] U.S. Cl. .................................. 364/200; 364/280; 364/281.3
[58] Field of Search ... 364/200 MS File, 900 MS File

[56] References Cited

U.S. PATENT DOCUMENTS

| | | | |
|---|---|---|---|
| 3,585,605 | 6/1971 | Gardner et al. | 364/200 |
| 3,955,180 | 5/1976 | Hirtle | 364/200 |
| 4,370,709 | 1/1983 | Fosdick | 364/200 |
| 4,727,480 | 2/1988 | Albright et al. | 364/200 |

Primary Examiner—Gareth D. Shaw
Assistant Examiner—Michael A. Jaffe
Attorney, Agent, or Firm—Joseph A. Biela; Lawrence D. Cutter

[57] ABSTRACT

An in-storage table pair structure is disclosed which extends to the user of the data processing system the internal structures of a component of the operating system. The table pair structure includes pairs of tables that are pointed to by a table pair pointer. A table pair pointer is a double word of virtual storage in which the first word is the address of a user-defined table and the second word is the address of a developer-supplied table. Both tables form a table pair. The table pairs permit functional routines (IETDFs) to reference data in both developer-supplied tables as well as user-defined tables in order to tailor a component of the operating system. The IETDF locates a particular table, or set of tables, by first referencing a global control block which contains addresses of two router control blocks. One is the developer-supplied router control block which contains table pair pointers to all developer-supplied tables that are used by the IETDFs and the other is the user-defined router control block which contains the table pair pointers for all user-defined tables that are used by all IETDFs. The user, through entries in the user-defined table, can add unique table entries that define new functions and override developer-supplied table entries, without actually making changes directly to the operating system or providing exit routines, by utilizing the same table entry identifier as is used to identify the corresponding entry in the developer-supplied table.

12 Claims, 8 Drawing Sheets

METHOD OF TAILORING AN OPERATING SYSTEM

BACKGROUND OF THE INVENTION

1. Field of the Invention

The present invention relates to data processing systems and more particularly to operating systems which can be tailored to meet installation-specific requirements.

2. Prior Art

Before productive work can be done on a data processing system (installation), the operating system must be initialized to specific starting values and states. The initialization of the operating system requires definitions and actions provided by generated values that are obtained from system generation, i.e. during the 'SYSGEN' process, from the system parameter libraries, and from directives provided by the system operator. The initialization process tailors an operating system to meet specific user needs.

The operating system is actually a set of many components, each of which performs an initialization before it can enter the normal processing mode. Some operating system components are initialized during the initial program load by the stand-alone initial program loader (IPL) while others are initialized following IPL. Some components, although integral to the operating system, are initialized, enter normal processing, and are terminated as often as necessary and as directed by system operators. One such component is the job entry subsystem (JES) component of the operating system, e.g. of the IBM MVS or the IBM MVS/XA operating system. Generally, the JES program reads jobs into the data processing system, converts them to internal form, selects them for execution, processes their output and purges them from the system. JES is the job flow manager within the operating system.

Job Entry Subsystem

JES is the operating system component that reads a series of JCL statements (a job), or a collection of jobs and input data (an input stream). JCL statements identify such things as the system resources and data that the job needs. JES reads each job, scans the JCL and writes it in records on a spool (such as a direct access memory device). The spool holds the jobs that need to be run and also jobs that have already run. Spooling, performed by JES, is the temporary storing of jobs and job-related data in intermediate stages of processing so that they are readily accessible. Because each job has a job class, priority, and output class, the job entry subsystem can select jobs for execution in a way that provides for the effective use of system resources.

JES is started by the action of a system operator. A master scheduler routine, which interacts with operator commands and system parameters, begins initialization of the JES program. Initialization is the means JES uses to ready itself for processing. JES performs an initialization the first time that it is started, and every time it is restarted after a normal shutdown, or after a system failure. Initialization statements and their parameters indicate which of the JES functions and devices are to be initialized. The initialization statements tailor the operating system by defining the functions and device characteristics that JES will use during its execution. This initialization of JES includes creating an address space for JES, initializing control task structures (in substantially the same manner as for any address space) to ready the JES address space for execution, initiating JES by building job control language (JCL) statements that invoke the JES initialization procedure, and passing the JCL statements to an initiator to start JES, i.e. passing control to JES modules. JES then performs its initialization, by using code in its own modules, operator directives, and system parameter library input (the SYS1.PARMLIB data set). System parameter lists are contained in the SYS1.PARMLIB data set. Each member of the data set contains parameters that the operator selects to control processing.

Post-Initialization Processing

After an operating system component such as JES has initialized, it must perform its tasks in support of the other components of the operating system.

In order to provide support to other operating system components, JES maintains many defining control blocks and tables. For example, JES control blocks and tables define the local printing devices and remote telecommunications connections.

As indicated above, the usual procedure for implementing JES involves building JES control blocks during JES initialization, then using them during subsequent processing. Control blocks are used during JES processing when operator-directed changes are made to them and when they are queried by the operator. Control block "changes" and "queries" generally involve actions that are called 'operator commands'. These operator commands, in effect, provide a means for "re-initializing" JES.

Installation Extensions

Many operating system components provide a capability for installation-specific tailoring and functional extensions to the operating system. The usual method for providing functional extensions is by implementation of installation 'exits' or exit routines. An exit is a defined point in operating system component processing where (user-created) code provided by the installation (rather than the operating system) is given control. That is, the operating system calls a user-created program. A purpose of the exit point (or exit routine) is to allow a user-defined function to affect operating system action. The exit routine runs as an extension of the operating system code and is dependent upon the internal structures of the operating system code. In other words, the user exit routine tailors the operating system by performing user-defined functions appropriate to that particular point in the initialization and control of the operating system. Operating system function can also be modified by directly changing the operating system code thereby necessitating a planned interruption of installation work in order to make installation-required parameter changes. However, it is very desirable to isolate user-created code from component code and to simplify the interfaces between the user and the operating system components.

Without isolation of the user code, the user code may have to be changed frequently as internal structures of the operating system change. Also, when problems are encountered in the operating system it is difficult to determine if the problem was caused by the operating system or the user exit routine. Thus, reducing the reliability and serviceability of the operating system.

In the IBM release SP 1.3.3, a new approach was added to the JES product to extend the EXTERNAL specifications of the subsystem product. The external specifications consisted of the parameters on initialization statements which were used to initialize JES. These parameters specify the initial state of JES, which is a component of the MVS operating system. Prior to this approach, the user had to provide an exit routine or modify the developer-supplied code. The SP 1.3.3 approach (initialization parameter modification) was then provided (extended) to the user through a generalized scanning facility, called $SCAN (which is described below). This support allowed the addition or modification of EXTERNAL parameters of JES initialization statements. In addition, the user could also define completely new user initialization statements for JES. This was accomplished by allowing the user to provide tables which defined the user parameters or statements. These user-defined tables were then used by JES in parallel with the developer-supplied initialization statement tables when processing the parameter library (SYS.1PARMLIB) defining the initial state of JES. The user no longer had to provide an exit or code modification to the developer-supplied code to provide extensions to JES initialization externals. This support eliminated the need for the exits to perform syntax checking and converting the parameter values to the proper internal format for later processing by JES for external initialization parameters. But this was only a primitive step in isolating user code and making modifications to JES. That is, the user was still required to provide major code modifications (to the operating system) and exit routines to the actual mainline processing of JES in order for JES to act and respond to the external requests made by these external initialization parameters. That is, the user could get external parameters into the operating system, but could not operate on them without, as before, directly modifying the operating system code. The initialization processing tended to be centralized (in one module) processing. However, the actual mainline processing to respond to the initialization specifications tended to be spread throughout the control block structures and code of the JES operating system component, thereby still requiring complex modifications to the developer-supplied operating system code.

In essence, the user was supplied with a set of developer-supplied functions and only through external parameters could a user change the number of developer functions that operate at one time, or the speed at which the developer-supplied function would execute, for example. This level of control was only possible through direct operating system code modification and by changing the subsystem control block structure. What was needed was a way for the user to easily control "how", "why", "when", and "where" internal functions operate by controlling the operating system code that performs such functions as PCE, DTE and work selection (described below) without actually modifying the operating system code that controlled such functions.

It is, therefore, an object of this invention to tailor operating system processing, during initialization, parameters, sub-tasking and work scheduling using the same defining tables and code as is used during post-initialization processing or an exit routine from the developer source code.

An object of this invention is to extend the internal structures of an operating system component (subsystem) to users of the operating system.

Another object of this invention is to provide functional routines that have their logic, and thereby the service they perform for components of the operating system, determined by data provided by the developer as well as data provided by the user that does not require the modification of any developer source code.

Another object of this invention is to provide (user-created) installation extensions (tables) for each developer-supplied table thereby modifying the operating system function without directly modifying the operating system code and without implementing exit routines, thereby isolating the user extensions from the internal structures and code of the operation system.

SUMMARY OF THE INVENTION

A data processing system is disclosed and claimed which has an operating system that includes an operating system component and at least one installation extendable table driven facility that has access to a primary control block which is part of a table structure. In particular, a method and apparatus is claimed for tailoring the operating system using an installation extendable table driven facility without modifying the operating system code or without implementing exit routines. A table structure that contains table pair pointers is created in which one table pair pointer points to one table of data and another table pair pointer points to another table of data. Data is contained, in the tables of data, in predetermined table entries on which the installation extendable table driven facility operates for the purpose of tailoring the component of the operating system by altering directly the operation of the internal structures of the operating system component.

DESCRIPTION OF THE PREFERRED EMBODIMENT

A data processing system includes an operating system that, when initialized, provides address spaces for each important component of the operating system such as MVS. If a system component has its own address space, that address space must be initialized to handle requests, and tailored (changed/modified/added to) to meet the requirements of the installation. The address space for the Job Entry Subsystem (JES) component of the operating system is shown in virtual storage layout 2 of FIG. 1. System area 4 and the common area 6 contain the system control program and various routines and data areas that pertain to the entire system. The JES address space occupies a portion of private area 8.

Figure 1:
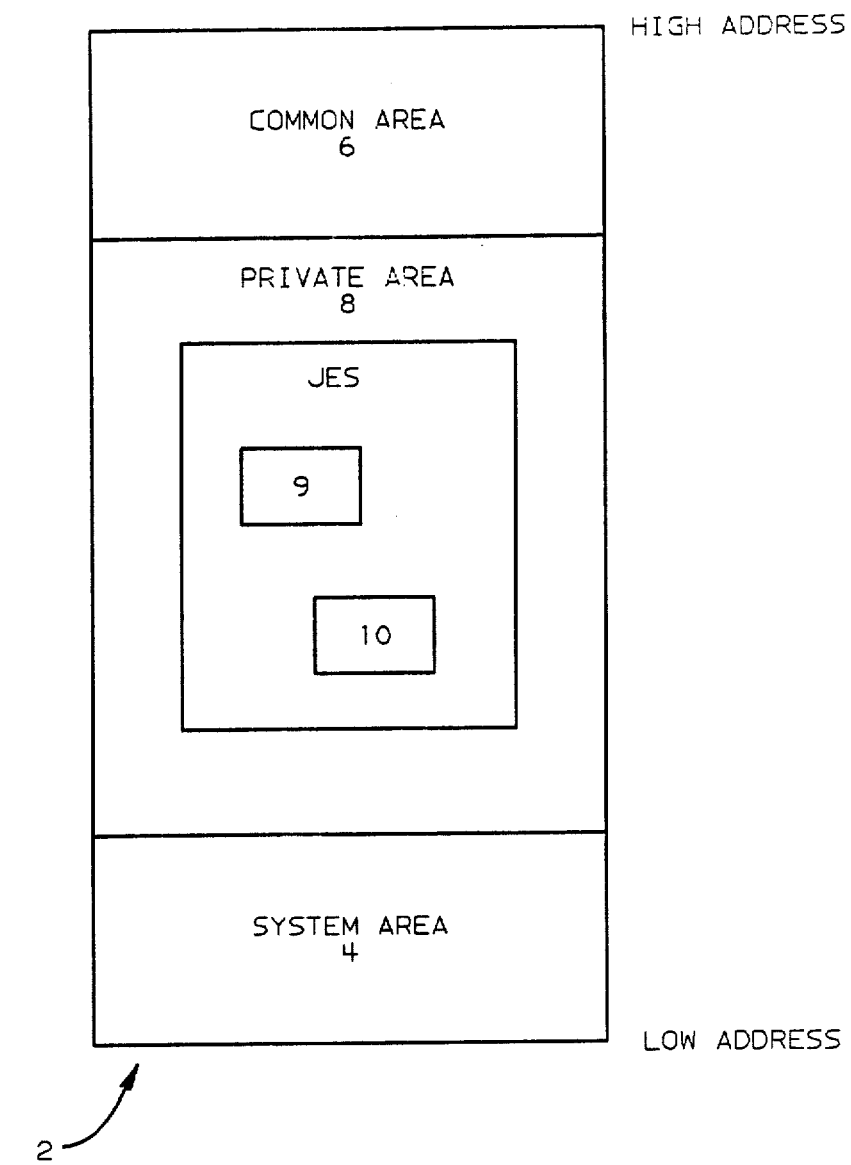
FIG. 1 is a schematic block diagram of virtual storage to include the address space for a component of the operating system and an installation extendable table driven facility.

A functional routine (or facility) can be utilized by an operating system component to facilitate the changes, modifications and additions made to the address space occupied by the system component. A specific type of facility, shown in FIG. 1 is an installation-extendable table-driven facility (IETDF) 9 which uses in-storage tables 10 that provide data for the facility to make logic decisions, e.g. to translate initialization statements and operator commands into logically grouped parameters, to add and delete JES subtasks, to create and maintain the JES trace facility parameters, to facilitate the selection of work by output devices and to add and delete JES processors, in order to tailor a component of the operating system without actually making changes directly to the operating system or providing exit routines. In this case, as a result of making these logic decisions, the IETDF performs a service for JES.

Table Pair

In accordance with the invention, tables 10 are in-storage pairs of tables which are pointed to by a table pair pointer. A table pair pointer is a double word of virtual storage that is defined such that the first word is the address of a user-defined table and the second word is the address of a developer-supplied table. Either word of a table pair can have a value of zero but both words cannot be zero simultaneously. A zero in a word of the table pair indicates that the table corresponding to that word is not to be used during the current IETDF processing. The user-defined table pointer word is referenced before the developer-supplied table pointer word so that the content of a field in the user-defined table can be used to add new user-defined function, change developer-defined function, or delete developer-defined function specified in the developer-supplied table. The improved user-defined table controls the internal structures of the operating system component without user modification to the control block structure of developer-supplied code. That is, the internal structures of the operating system component are made accessible to the user. (Internal structures are control blocks that contain data which controls subsystem execution such as the subsystem processor control element (PCE) dispatching queues, or the daughter task element (DTE) control block chains and the functional routines that operate on those control blocks.) In order to accomplish this, the internal structures of the operating system component (JES) were restructured in order to utilize the data in the internal table pair structure described herein. Previously, no one exit routine or user modification would have been able to interpret and process the table pair structure. The reason is that code in many phases of JES processing must access the same internal control block structures. This coded dependency on control block size, field definition, queueing algorithm, serialization and locking techniques, etc., requires that when users want to tailor the operating system (create their own extensions), they must modify code directly in many different areas within JES due to the changes in control block structures that are referenced by the many phases of JES processing. Such phases include initialization for obtaining the resources required to satisfy the user requests, recovery processing to handle errors, e.g. machine checks, mainline processing to perform the user functions, e.g. a new subtask that performs additional security processing, and termination processing to free all the resources which may have been obtained, e.g. releasing a device for use by other parts of the operating system. As a result of this invention, the user no longer directly modifies the control blocks and developer-supplied code at each of the above referenced phases. The improved internal table pairs structure permits user-supplied internal functions, i.e. internal structures of the internal processor control element, the internal daughter task element, work selection, etc., to be processed as though they were developer-supplied functions thereby allowing the user to customize the operating system, i.e. to alter the way the internal functions operate, to meet the user's unique requirements without direct modification of the developer's operating system. A developer-supplied table is one provided by the developer of a component of the operating system and, generally, the operating system itself.

Table Macro

A table macro is generally created in order to facilitate the creation of user-defined and developer-supplied tables. The table macro contains keywords that specify the data to be stored in tables to be used by an IETDF in order to make logic decisions to provide a service for a system component such as JES. As an example, a table macro for generating tables is named GENTAB. Keywords (keyword parameters) in the GENTAB macro will permit a user (as well as the developed) to specify the data to be contained in predetermined locations in the user-defined and developer-supplied tables. This data will be used by the IETDF for providing a service to an operating system component. The keywords used for specifying the data in this example are &KEYXXX and &KEYZZZ. Keyword &KEYXXX provides data to an IETDF that performs service (function) XXX and keyword &KEYZZZ provides data to an IETDF that performs service (function) ZZZ. Keyword &KEYID specifies a unique identifier for an entry in this particular table. In this case, each GENTAB table entry will contain a unique identifier and corresponding data specified by the &KEYID, &KEYXXX and &KEYZZZ keyword parameters respectively. The use of &KEYID implies that a table entry is a unique data table entry. A keyword (&KEYTAB) specifies the start of a table as well as the end of a table. In addition, the &KEYTAB parameter defines whether the table is a developer-supplied table or a user-defined table. In other words, &KEYTAB parameter may have the value "IBM" (designating that the table is supplied by the developer-IBM) or "USER" (designating that the table is defined by the user) or "END" (designating the end of the table). The prototype table macro statement, to include the above (undefined) parameters, would be:

```
GENTAB &KEYTAB=, &KEYID=,
    &KEYXXX=, &KEYZZZ=
```

The table macro is used to build the tables at the time that the system component, i.e. JES, is assembled. This prototype statement specifies the mnemonic operation code and the format of all macro instructions that are to be used to call the macro definition. The statement has a symbol (GENTAB) in the operation field of the prototype statement which establishes the name by which the macro definition must be called. The statement also has an operand field having several keyword parameters (&KEYID, &KEYXXX and &KEYZZZ). A (standard) value of a keyword parameter in the prototype statement, i.e. a value following an equal sign, can be overwritten by specifying the same keyword operand in the calling macro instruction. Otherwise, the standard value becomes the value of that keyword parameter for that call.

The following is an example of how a developer would create a table using the GENTAB macro.

```
GENTAB &KEYTAB=IBM
GENTAB &KEYID=alpha,    &KEYXXX=data1a,
                        &KEYZZZ=data1b
GENTAB &KEYTAB=END
```

The first statement, in the above example of a macro definition, is the macro definition header statement. This statement indicates the start of table creation. "IBM" is a parameter value that is found in the header of this developer-supplied table. A label for resolving the address of the table is generated with each table header. The second statement creates one table entry that contains "data1a" and "data1b" as constant data items that are uniquely identified by character string (entry identifier) "alpha". The third statement is the table trailer (or footer) statement. The macro trailer statement indicates the end of the table. The &KEYID keyboard is used to uniquely identify each entry of the table.

The following is an example of how a user would create a table using the GENTAB macro.

```
GENTAB &KEYTAB= USER
GENTAB &KEYID= able,    &KEYXXX=data4a,
                        &KEYZZZ=data4b
GENTAB &KEYID= baker,   &KEYXXX=data5a,
                        &KEYZZZ=data5b
GENTAB &KEYTAB= END
```

The first GENTAB statement indicates the start of table creation. In this case, the first GENTAB statement includes a parameter value that indicates that this is a user-defined table. The "USER" is the parameter value that is found in the header of this user-defined table. The second GENTAB statement identifies the entry for "able" (a unique table entry identifier) and also contains data for an IETDF that performs function XXX and IETDF that performs function ZZZ. The third statement identifies the entry identifier "baker" and contains different data for the IETDF that performs function XXX and ZZZ. The fourth statement indicates the end of the table by creating the "table footer".

Table Structure

A table structure, which is the primary data structure in the JES component of the operating system, includes at least one table. In this case, a table structure is a data structure that permits functional routines (IETDFs) to reference data in both developer-supplied tables as well as user-defined tables. See the prior discussion as to how these tables are created.

A table is an orderly set of architected data constants that are used by the functional routines during the execution of logical operations, i.e. to make logic decisions. A table generally includes three types of fields (or entries). There is a first field whose content defines the start of the table. There is at least one second field that provides the data that is utilized by a component of the operating system, i.e. utilized by a functional routine to provide a service for a component of the operation system. There is a third field that defines the end of the table. In this case, pairs of tables are defined for use by an IETD facility.

Figure 2:
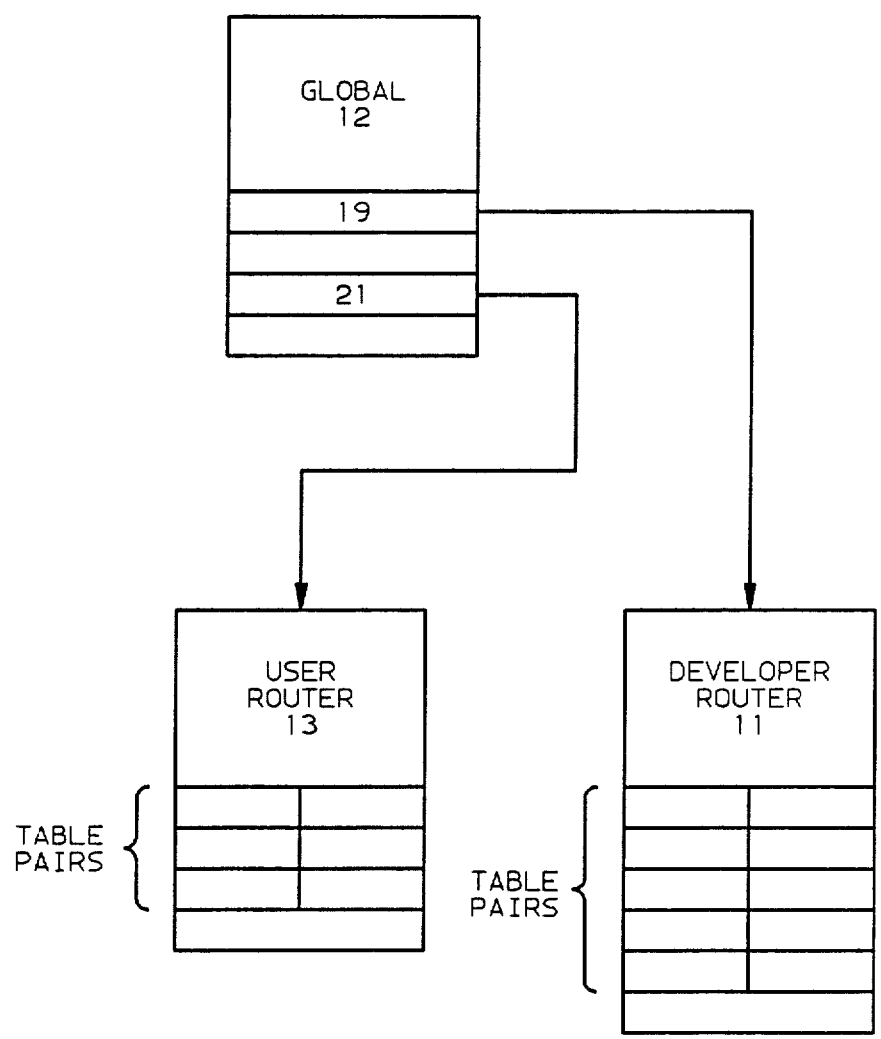
FIG. 2 is a schematic block diagram of the table structure to include control blocks with table pair pointers.
Figure 3A:
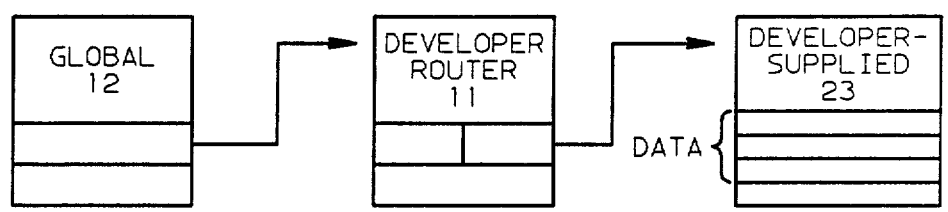
FIG. 3a is a schematic block diagram of the table structure of FIG. 2 showing a pointer to a developer-supplied table.

As shown in FIG. 2, the table structure of the present invention permits the IETDF to locate a particular table, or a set of tables. The table structure contains first router control block 11 for the developer-supplied tables and second router control block 13 for the user-defined tables. The address of each router control block must be readily accessible by the operating system and, in particular, by the IETDF. Therefore, the address of each router is stored in global control block 12 which is referenced by the IETDF directly. First and second router control block fields (19, 21 respectively) in global control block 12 are set with the appropriate address of the router control blocks when the main JES load module (HASJES20) is loaded into the JES address space (as shown in FIG. 1) at the start of JES processing. The developer-supplied router control block 11 contains the table pair pointers for all developer-supplied tables which are used by all IETDFs and user-defined router control block 13 contains the table pair pointers for all user defined tables which are used by all IETDFs. As indicated above, a table pair pointer is architected as a double word, with the first word containing the address of the user-defined table and the second word containing the address of the developer-supplied table. Either word of a table pair in a router control block can have a value of zero indicating that there is no corresponding developer-supplied or user-defined table to be used during the current processing of an IETDF. Otherwise, a word in a table pair having a non-zero value points to the corresponding table as shown in FIG. 3a. In FIG. 3a, the second word in a table pair pointer in first router control block 11 points to developer-supplied table 23.

Figure 3B:
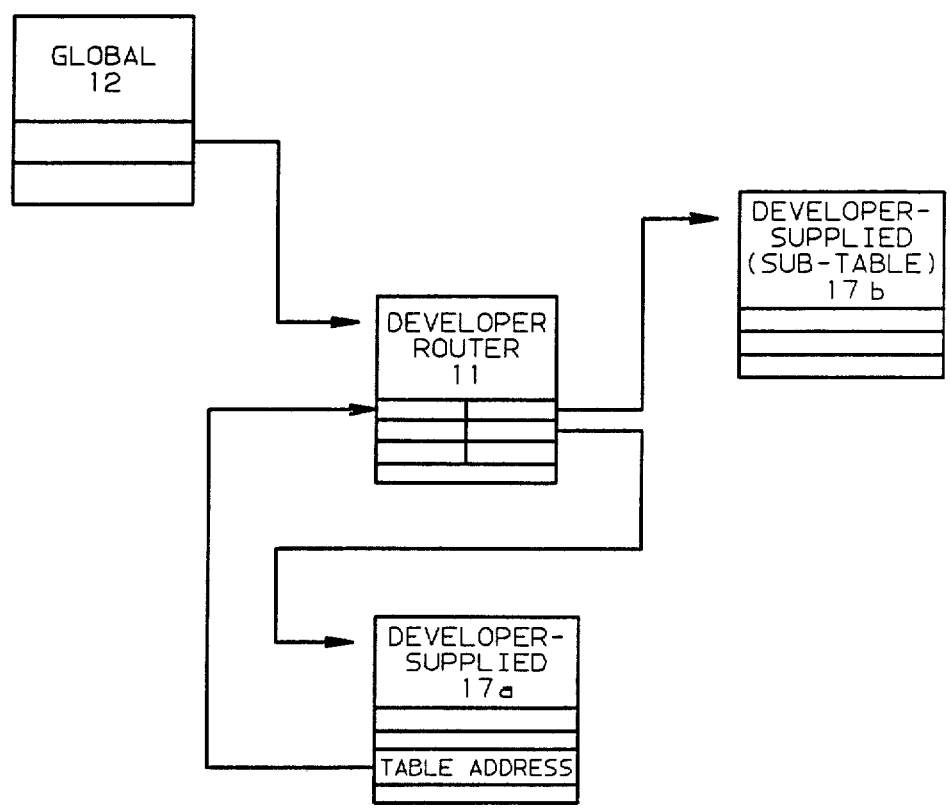
FIG. 3b is a schematic block diagram of the table structure of FIG. 2 showing a pointer to a developer-supplied subtable.

This table structure permits a table, that is located by a table pair pointer, to contain a pointer to a sub-table via another table pair as shown in FIG. 3b. Developer-supplied table 17a is pointed to by the second word of a table pair pointer in first router control block 11. An entry in table 17a is the address of a different table pair pointer in router control block 11. The second word in this different table pair pointer points to (another) developer-supplied table 17b which is really a sub-table of developer-supplied table 17a. Sub-tables are used to provide additional data for a particular (complex) IETDF.

Router Tables

Figure 4:
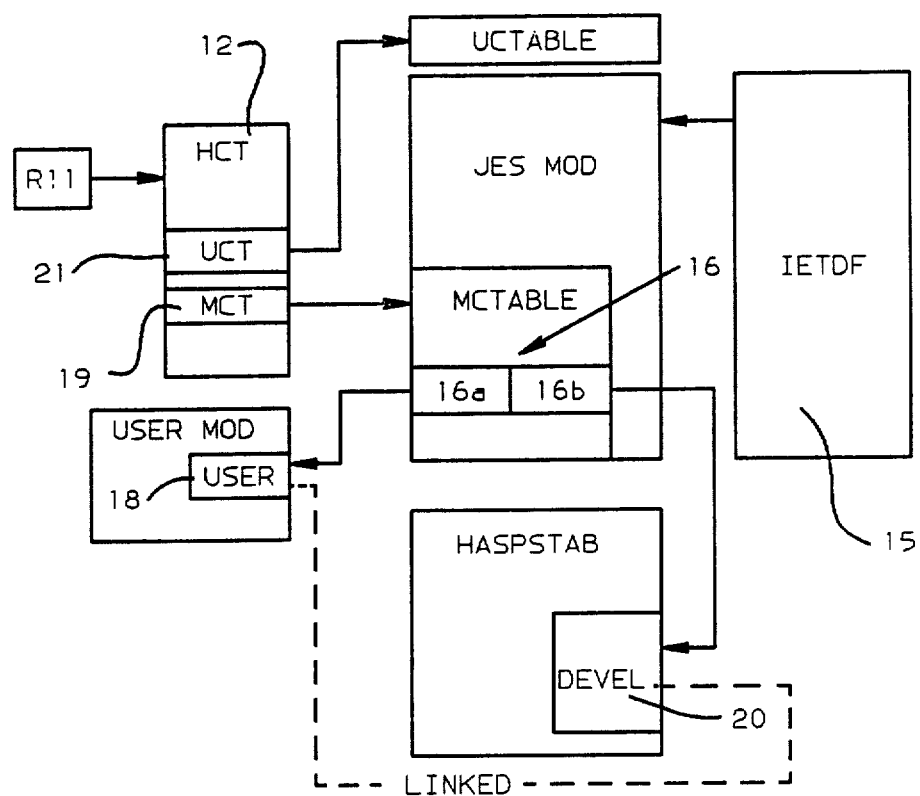
FIG. 4 is a schematic block diagram of the table structure of FIG. 2 and further showing the structural relationship of user-defined and developer-supplied tables.

With respect to the JES component of the operating system, all developer-supplied table pair pointers reside in a single control block called the Master Control Table (MCT) which is pointed to by, in this case, Houston Automatic Spooling Program (HASP) Communications Table (HCT) 12 generally shown in FIG. 3 and particularly shown in FIG. 4. HCT 12 is generally pointed to by the content of general purpose register eleven (R11). The HCT contains the address (19) of developer-supplied router control block 11 (or MCT) that contains the developer-supplied table pair pointers (MCTABLE) in a JES module (JES MOD) which point to the developer-supplied tables that are in another JES module (HASPSTAB) and the user-defined tables that are in A user module (USER MOD). The HCT also contains the address (21) of user-defined router control block 13 (or UCT) that points to user-defined table pair pointers (UCTABLE) which are in another user-provided module. Specifically, developer-supplied table pair pointer 16 is found in MCTABLE in the JES MOD. For this example, this is the developer-supplied table pair pointer that is used when IETDF facility 15 is invoked e.g. when the developer-supplied HASPSCAN module is executed invoking the developer-supplied SCAN IETD facility. The first word 16a in table pair 16 points to user-defined table 18 in USER MOD and the second word 16b in table pair 16 points to developer-supplied table 20 in HASPSTAB. User-defined table 18 in the user module (USER MOD) is linked to developer-supplied table 20 in the JES HASPSTAB module. The HASPSTAB module contains the tables created by a particular developer-supplied table macro for an IETDF. The USER MOD contains the tables created with a particular developer-supplied table macro.

Functional Routines

A functional routine is a program controlled by a component of the operating system in which logical operations utilize the content of tables that are external to the functional routine. (Portions of the operating system had to be redesigned to be able to provide for the processing of functional routines with their specific logic decisions governed by the data contained in the table pairs.) For example, the allowed upper and lower numeric limits of a system parameter involved in a logical operation in a functional routine are provided by data constants (values) in the fields of tables which are external to the functional routine. Examples of functional routines (IETDFs) are provided below.

Figure 5:
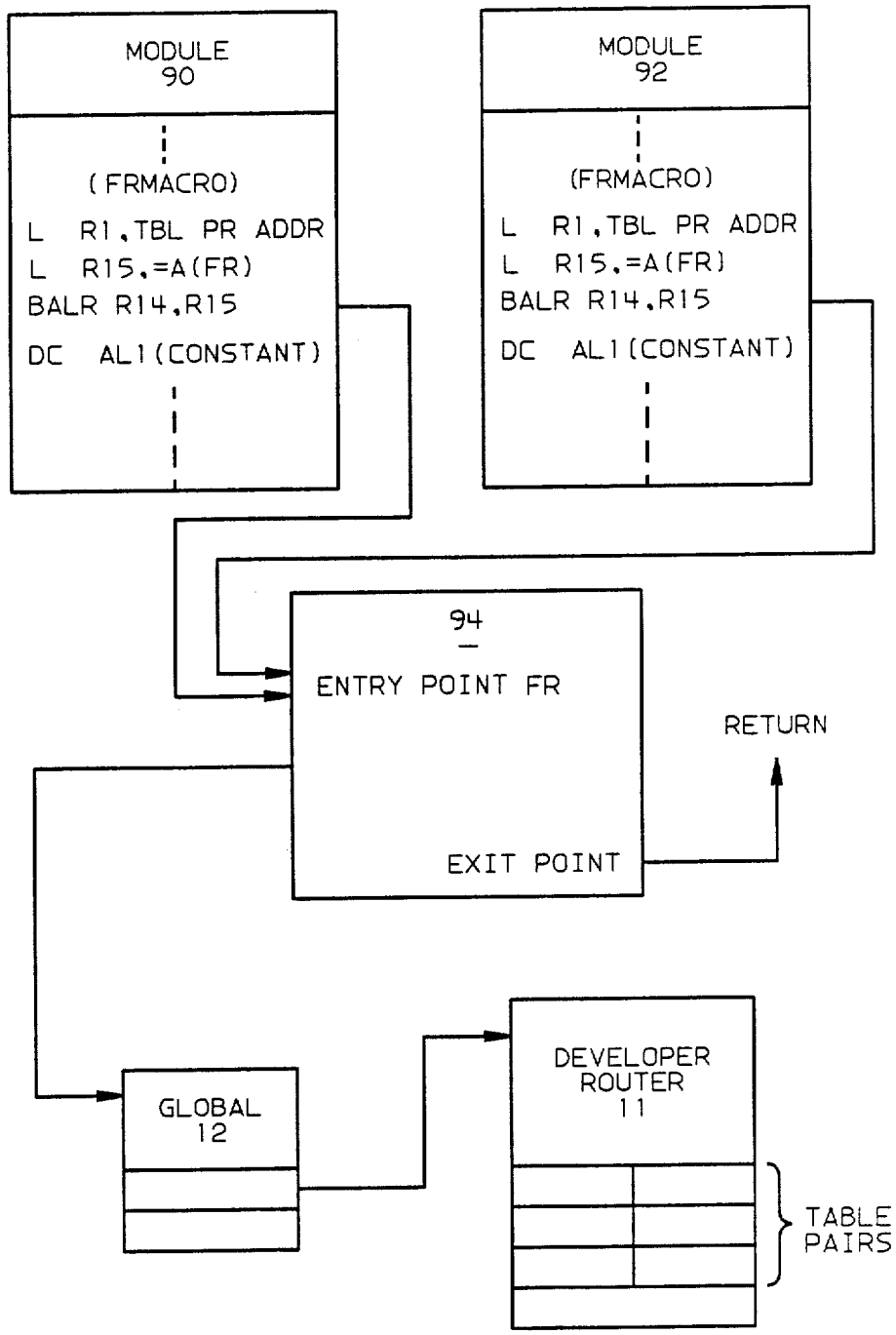
FIG. 5 is a schematic block diagram of the interface between a functional routine macro and the table structure of FIG. 2.

Functional routines, which are generally written by the developer, access developer-supplied and user-defined tables using the above described table structure. Functional routines are designed to search the user-defined table (if one exists) first, and the developer-supplied table second. This permits the user, through entries in the user-defined table, to add unique table entries that define new function and override developer-supplied table entries by utilizing the same table entry identifier as is used to identify the corresponding entry in the developer-supplied table. A functional routine macro is used as an interface to the functional routine for both developer and user-provided code as shown in FIG. 5. In FIG. 5, a functional routine macro named FRMACRO, which can be called by both developer-provided module 90 and user-provided module 92, generates code that contains a list of parameters and the instructions required to branch to functional routine 94. The keywords in FRMACRO permit both developer and user-provided code to pass specific data to the functional routine. The functional routine 94 accesses the tables in the table structure by first locating global control block 12. In FIG. 5, global control block 12 points to developer-supplied first router control block 11 which has table pair pointers that point to user-defined tables as well as developer-supplied tables as described above.

If KEYTP is the keyword that specifies the table pair pointer address and KEYUID uniquely identifies the table entry, then the functional routine macro prototype statement is written as follows:

FRMACRO &KEYTP=&KEYUID=

Specifically, if the keyword parameters in the above macro prototype are defined such that the prototype statement becomes:

FRMACRO &KEYTP=ROUTER1,
  KEYUID=12

... the following instructions will be generated once the above functional routine macro is assembled:

L R1, =A(ROUTER1)
L R15, =A(FROUTINE)
BALR R14, R15
DC AL1(12)

In the above group of instructions, the first instruction will load the address of the table pair pointer to be accessed from ROUTER1, e.g. DEVELOPER ROUTER 11 in FIG. 5, to general purpose register 1 (R1). In the second instruction, the starting address (branch address) of the functional routine to be executed is loaded into general purpose register 15 (R15). In the third instruction, the data representing the current program status word (including the updated instruction address) is loaded as link data in general purpose register 14. Subsequently, the previously updated instruction address is replaced by the branch address (starting address of the functional routine) in general purpose register 15. Following execution of the third instruction, the functional routine FROUTINE is entered. The fourth instruction defines a data constant needed for program execution. The data constant represents an entry in a user-defined or developer-supplied table pointed to by a word in a table pair pointer, identified by &KEYTP, in the router control block, i.e. DEVELOPER ROUTER 11. The above instructions, generated at assembly time by the functional routine macro, pass the address of the table pair pointer (now in R1) and a constant identifying table entry 12 to the functional routine in order for the functional routine to use the data in the entry uniquely identified by 12 in the user and/or developer-created tables. The functional routine is then executed using this data.

Functional routines are dependent on (operate on) data defined and stored in predetermined locations in the tables. Using this data, functional routines (IETDFs) provide specific services for components of the operating system such as JES. Such services include managing JES processors, managing JES subtasks and selecting work for output devices. It is the specific table(s) and, more specifically, table entries or data in those tables that determine the output of the service provided by a functional routine. The tables can be developer-supplied tables as well as user-defined tables. A functional routine will locate a table pair pointer and then reference the user table first. The user table is pointed to by the first word of the table pair pointer. A non-zero value in the user word of the table pair indicates to the functional routine that a user table exists. If a user table exists, the functional routine will search the user table (sequentially) for data in a specific entry in accordance with a specific table entry identifier passed via the functional routine macro. (In the above example, the identifier was 12.) If a table entry that matches the identifier is found in the table, the functional routine will use the data at the entry to make a logical decision, thereby providing its service to a component, e.g. JES, of the operating system. The functional routine then returns to the caller of the functional routine macro. If a user-defined table is not defined (user table pair word is zero), then the developer-supplied table is automatically located via the second word of the table pair. The developer-supplied table is then searched (sequentially in response to the same instructions in the functional routine as were executed when searching the user-defined table) for the entry in a location (identified by 12 in the above example) specified in the functional routine macro call. Functional routines first locate and search the user-defined table and then the developer-supplied table. This permits the user to supersede one or more developer-supplied table entries, and also permits the user to define unique table entries that support the user's own system requirements without modifying or altering any of the developer's operating system code and without the use of exit routines.

The user can, by way of IETDFs, tailor its own unique functions to the developer-supplied operating system without modifying or changing the developer's source code. The scope of the functions that can be tailored by the user is not governed by specific exit points in the operating system. Instead, the user has control over (and decides) the logic requirements for the routines of the operating system without writing elaborate "user exit" routines. The keyword parameters in the table macros are not tied to the underlying operating system structure of control blocks and data areas. The user is now capable of easily controlling the usually complicated developer-supplied functional routines and operating system by the use of a table macro.

There are several IETD facilities. Some are simple IETDFs and others are complex IETDFs. A complex IETDF is distinguished over a simple IETDF by having multiple levels of tables (sub-tables) in its' table structure.

Functional Routine Summary

Figure 6:
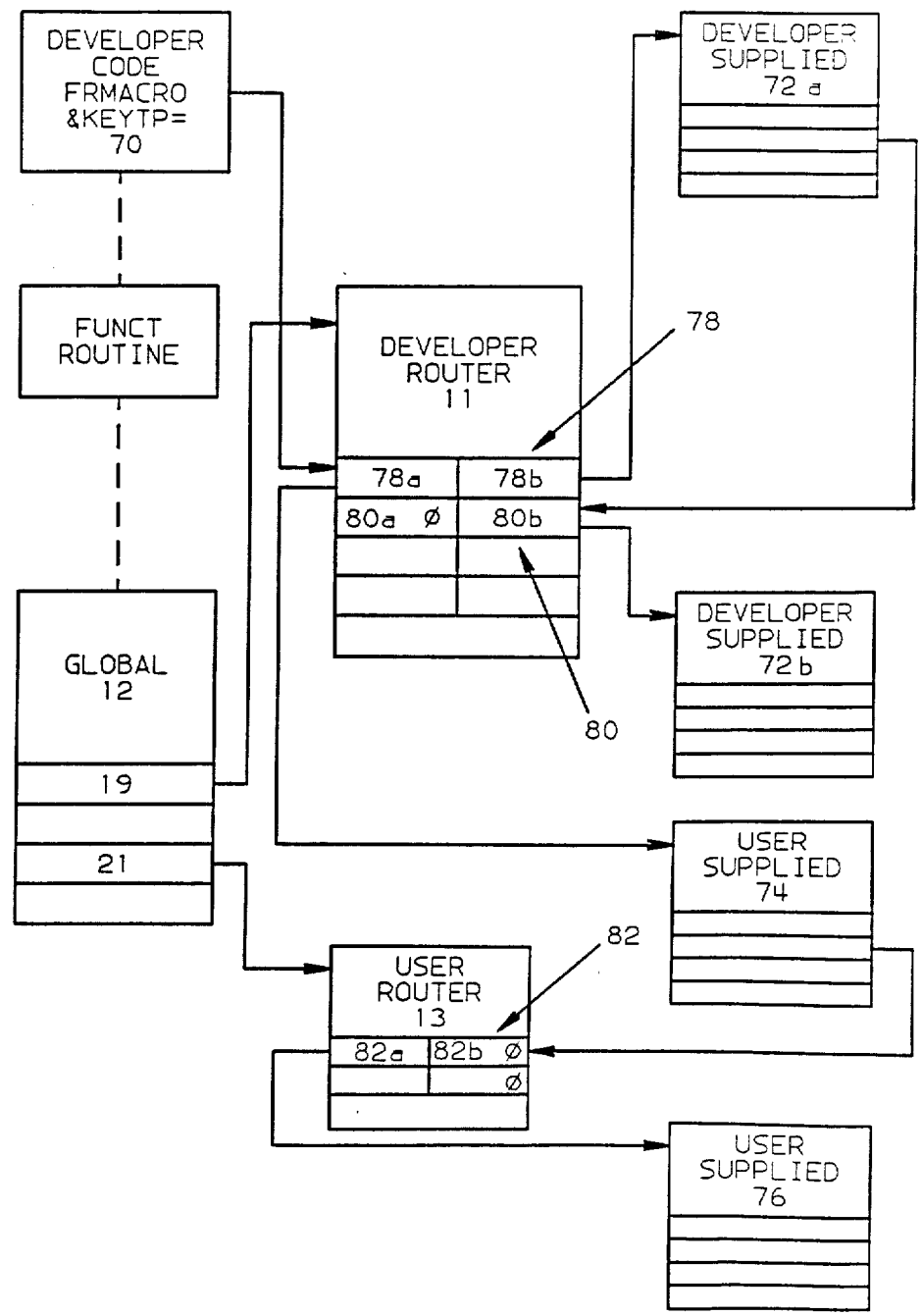
FIG. 6 is a schematic block diagram of a complex table structure which is accessed by functional routines.

As was indicated above, functional routines access developer-supplied and user-defined tables in order to obtain data from those tables to use in logical operations. Functional routines interface with the developer's or user's own code by way of a functional routine macro. In particular, the functional routine macro FRMACRO, in functional routine 70 shown in FIG. 6, includes keyword parameter &KEYTP which specifies the address of a particular table pair pointer in first router control block 11 provided by the developer. (An instruction in code generated by FRMACRO branches to the functional routine as indicated by the dotted line in FIG. 6.) The first router control block is pointed to by the content of a field (19) in developer-provided global control block 12 to which an operating system component such as an IETDF has access (dotted line between FUNCT ROUTINE and GLOBAL 12). Second router control block 13, provided by the user, is pointed to by the content of another field (21) in the global control block. Within router control block 11 is table pair pointer 78 that contains second word 78b that points to first developer-supplied table 72a. In FIG. 6, the content of a word (an entry) in first developer-supplied table 72a points to (another) table pair pointer 80 in router control block 11. The content of first word 80a in table pair pointer 80 is zero indicating that, for this table pair pointer, there is no user-defined table, i.e. for this implementation of the IETDF. However, the content of second word 80b is non-zero. The content of this second word of-table pair pointer 80 contains the starting address of second developer-supplied table 72b which is, in fact, a sub-table of first developer-supplied table 72a. The first word (78a) in table pair pointer 78 in developer-provided control block 11 points to first user-defined table 74. In FIG. 6, an entry in first user-defined table 74 points to table pair pointer 82 in user-provided second router control block 13. Since the content of second word 82b in table pair pointer 82 is zero, there is no (linked) developer-supplied table, corresponding to the user-defined table, for the current processing of this IETDF. However, first word 82a in table pair pointer 82 points to second user-defined table 76 which is a sub-table of first user-defined table 74.

Developer-supplied tables 72a and 72b, and user-defined table 74 are, collectively, part of the developer-defined table structure. The developer-defined table structure includes both developer-supplied tables as well as user-defined tables. User-defined table 76 is part of the user-defined table structure. In this case, the user-defined table structure includes only user-defined tables since the content of each second word in the table pair pointer in the second router control block is zero. In fact, in the example described above and shown in FIG. 6, since sub-tables are implemented, the above example is one of a complex IETDF.

Each table entry (or field) in the various developer-supplied and user-defined tables contains data for the functional routine to use as it provides a service to a component of the operating system such as JES. The functional routine obtains access to this table structure, in which tables are created by both developer and, most importantly, the user, by way of a macro e.g. GENTAB, within the developer-supplied or user-defined code or modules.

SCAN Facility $SCAN IETDF

The $SCAN facility is an example of a functional routine or IEDTDF that is used for scanning input (e.g., initialization statements and commands) based on a general grammar, specific table definition, and special exit routine processing. $SCAN is basically designed to perform most of the scanning required for processing the JES initialization statements and commands, with the remaining processing for those statements being done by the exits from $SCAN, and to allow the use of multiple tables to define the allowed parameter input. $SCAN can scan various input structures, including those that require recursive calls to $SCAN itself. At each level of recursion, $SCAN can use tables of specifications (that are pointed to by table pair pointers) that define the allowed input at that level. The resulting action is the setting or displaying of the table/input specified value.

$SCAN ROUTINE PROCESSING GOVERNED BY TABLE PAIR INPUT

The $SCAN facility is controlled by the definition of the tables and the specifications on input to $SCAN. Currently, two actions are supported; Display of a value(s) or setting of a value(s). The success of these two actions is governed by the table definitions as specified by the developer-supplied table and the user-defined table as follows.

Initially, the $SCAN facility locates the beginning of the first keyword. The delimiter for this keyword is defined as an alphanumeric value. Next $SCAN isolates the keyword by locating the ending point. This is delimited by an equal sign (=), comma (,), slash (/), open parenthesis ((), or a close parenthesis ()). Once the keyword is isolated, this keyword is used as a token or identifier to find the proper table entry that defines this keyword.

On input to $SCAN, the caller passes an address of a table pair pointer that is to be used. The first portion of this table pair is a pointer to a user defined table. This table is looked in first. The latter portion of the table pair pointer is a pointer to the developer-supplied table. This table is looked in last. $SCAN looks at each table entry (user and then developer) looking for a match on the table entry identifier or token (the isolated keyword). Once a match has been found, this table is remembered and table processing stops. Therefore, if the table entry found is in the user specified table, then the user has either added or replaced a table entry, thus modifying the later processing done by JES without the user changing any JES source code. If an entry is not found, then the user has deleted a table entry, thus modifying the later processing done by JES without the user changing any JES source code.

Once the proper table entry has been located, the $SCAN facility determines, based on the table entry (data), if, on a SET call:
  A. input is allowed
  B. what the input should look like
    1. its allowed values
    2. its allowed range
    3. its allowed length
    4. its rounding factor
  C. where the input is to go
    1. what control block
    2. how to find the control block
    3. what field in the control block
    4. if the control block should be created
  D. whether a recursive $SCAN call should be done to complete the scan of this input
  E. what pre or post-scan exit routines should be called
  F. what callers of $SCAN are permitted to access this table For a DISPLAY $SCAN, $SCAN determines, based on the table entry:
  A. what field in what control block should be displayed
  B. what the characteristics of the value in the field are
  C. what to display based on the value
  D. whether a recursive $SCAN call should be done to complete the scan of this input
  E. what pre-or post-scan exit routines should be called
  F. what callers of $SCAN are permitted to access this table.

Based on this table entry $SCAN next issues a pre-scan exit routine call, if a pre-scan exit routine has been specified by the table entry. This exit routine allows for specific processing that must be done to complete the processing requested. The exit routine is specific for the keyword in that the exit routine is specified by the entry in the table that defines this keyword. If processing is to continue (the exit routine has the option to terminate processing for this keyword), the function (SET/DISPLAY) is completed.

The SET operation is completed by locating the value that is to be set in the table specified field. The value of the input is verified based on table specified information and the value is then saved in the field. In case of later errors, the original value of the field is saved. This original value will be restored to the field if an error is found at any point in the processing of the input.

The DISPLAY operation is completed by locating the field that is to be displayed using the information in the table. Using the information (or data) supplied by the table, $SCAN makes the value in the field displayable. Once all of the values that are to be displayed have been found and made displayable, $SCAN calls a display routine that was specified by the caller of $SCAN. In this way, if an error is encountered (e.g., if the caller is not permitted to access a specified table) information is not displayed to a caller that is not authorized.

It is during the processing of the function (SET or DISPLAY) that scan determines if a recursive call to itself must be done to complete the request. This decision is based on the information in the table. In this way, $SCAN has the ability to perform recursion to any level necessary searching a hierarchical set of tables to complete the request.

Once the function is completed (SET or DISPLAY), $SCAN issues a post-scan exit routine call, if one was specified in the table. This exit routine allows for specific processing that must be done to complete the processing requested.

At this point, $SCAN has completed the processing required to complete the request for this keyword. $SCAN then attempts to find the next keyword to repeat the process. Once all keywords in the input have been processed, $SCAN completes the request by determining that no errors were encountered and exits to the caller of $SCAN. If the request was for a DISPLAY, $SCAN will issue the display call and then exit to the caller. If an error is encountered, $SCAN will restore the original values (for a SET call) and return. If an error was encountered for a display, no values are displayed and $SCAN returns to its caller.

$SCAN TABLE STRUCTURE

Figure 7:
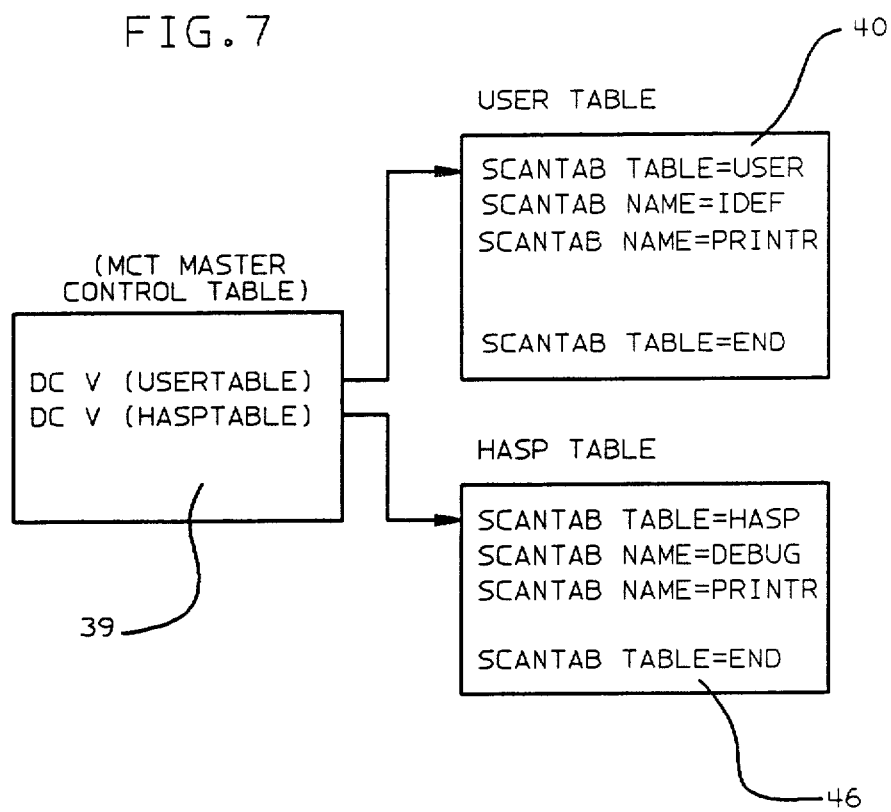
FIG. 7 is a schematic block diagram of the table structure shown in FIG. 2 used in $SCAN processing.

As with all the table structures in JES, the $SCAN facility utilizes the table structure initiated from the developer-supplied router control block, the MCT. As stated previously the MCT is a control block that points to a table pair (from a table pair pointer). The table pair, however, does not need to reside in the MCT. Users can have the table pair in their user-defined router control block, the UCT (User Control Table). Such a table pair address is passed to $SCAN. The first entry in the table pair holds the address of the user-defined table while the second holds the address of the developer-supplied table. The user table is initiated by specifying TABLE=USER and terminated by TABLE=END. The developer-supplied table is initiated by specifying TABLE=HASP and terminated by TABLE=END. FIG. 7 is an example of a user-defined table and an developer-supplied table. Note that $SCAN will look for a matching entry in the user-defined table first and then will check the developer-supplied table. Therefore, if the following initialization statements were specified, the following processing would occur:

IDEF PARM1=,PARM2=
PRINTR INSTBRST=
DEBUG=YES

The first statement, IDEF PARM=,PARM2= would be processed by $SCAN first isolated IDEF in the input. Next $SCAN would find the table pair in MCT 39. The table pair pointer specified in FIG. 7 points to user-defined table 40. Therefore, $SCAN would search the user table delimited by TABLE=USER and TABLE=END. $SCAN would find the first data table entry (i.e., $SCAN NAME=IDEF) as a match and use this table entry to evaluate the IDEF initialization statement. In this way, a user has added an initialization statement to JES without modifying any JES source code.

In the second example, PRINTR INSTBRST, $SCAN would again search the user-defined table 40 first in order to try to find the second data table entry (i.e. $SCANTAB NAME=PRINTR) as a match and use this table entry to evaluate the PRINTR initialization statement. Note that $SCAN does continue to search the tables to locate another match. Thus, $SCAN did not find the entry in the developer-supplied data table 46 for PRINTR. In this way, a user has modified an initialization statement in JES without modifying any JES source code.

In the third example, DEBUG=YES, $SCAN would search the user table (first) and not find a match. Therefore, $SCAN would search the IBM supplied table and find the first data table entry in it and locate a match and use this table entry to process the statement. In this way, users have modified the processing for some initialization statements without affecting the processing that happens for others.

The data table entries can point to other sets of tables to complete the processing for input.

Figure 8:
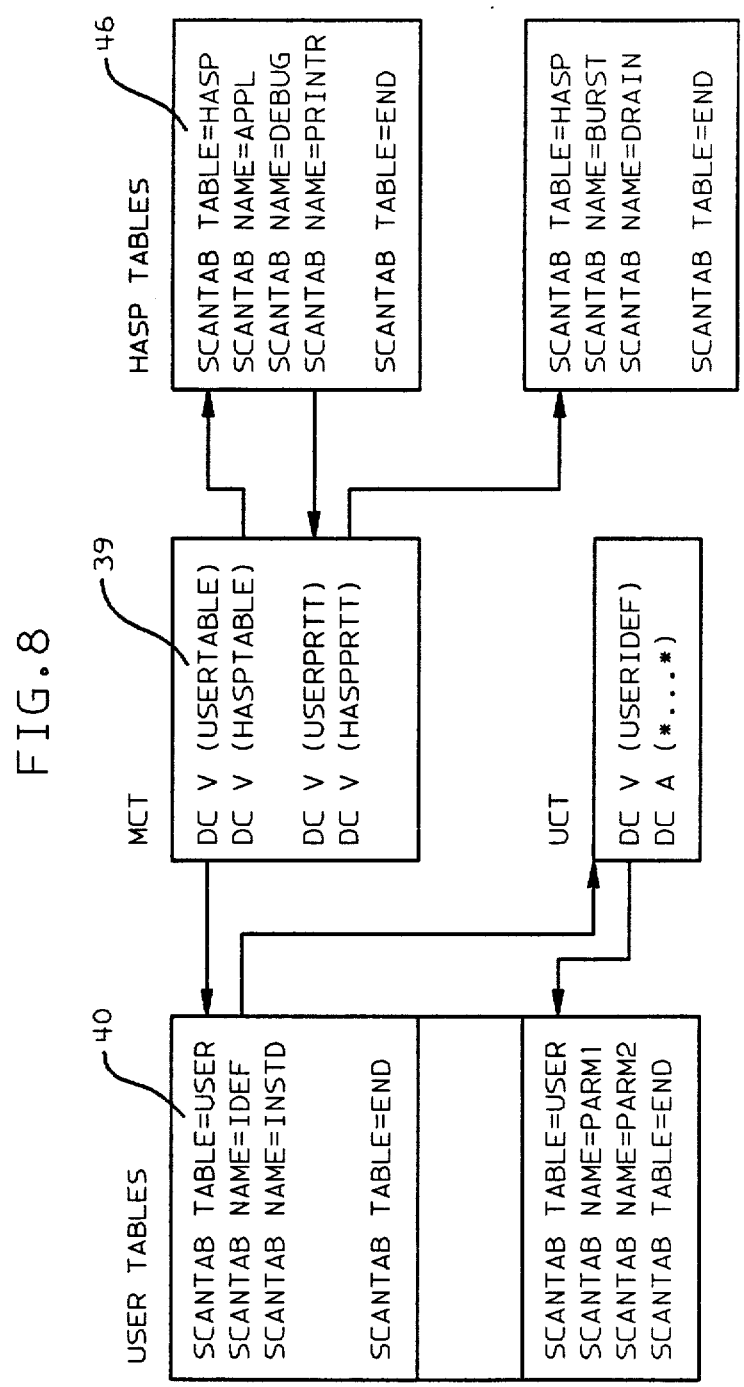
FIG. 8 is a schematic block diagram showing $SCAN tables pointing to other $SCAN tables.

FIG. 8 provides an example of $SCAN tables that point to other $SCAN tables. That is, data table entries can point to other sets of tables to complete the processing for the input. In order to follow the tables in the figure, two examples will be used:

1. IDEF PARM1=0,PARM2=4
2. PRINTR DRAIN,BURST

The first example is IDEF. $SCAN is passed the address of the first table pair in MCT 39. Therefore, $SCAN searches the user-defined tables (40) for IDEF and finds a match. While processing the IDEF keyword, $SCAN determines from the $SCAN table for IDEF that subscanning is required. Therefore, using the information in the table, $SCAN calls itself recursively to process the PARM1=0,PARM2=4 part of the input. It passes itself the address of the table pair it is to use, which resides in the user UCT. Using the first entry in the table pair, $SCAN finds the data table entries for PARM1 and PARM2. Note that there is no developer-supplied tables (46) for the parameters on the user IDEF initialization statement. This is shown via the zero (* . . . *) in the second part of the table pair in the UCT.

The second example is the PRINTR statement. In this example, $SCAN searches the user table (46) for the keyword PRINTR. When $SCAN does not find a matching entry, it searches the developer-supplied tables and finds a match with the third data table entry. In the processing for this keyword, $SCAN determines from the table that subscanning is required. Therefore, using the information in the table, $SCAN calls itself recursively to process DRAIN,BURST part of the input. It passes itself the address of the (next) table pair that it is to use, which resides in the MCT 39. If the first entry does not point to a table i.e., is zero $SCAN uses the tables pointed to by the second part of the table pair to process the statement.

This "leveling" of the $SCAN tables to process the input can proceed to any required level of tables.

$SCAN TABLE AND MAPPING MACROS

A. $SCANWA (SCWA) is a non-executable macro that maps the $SCAN facility work area. A new work area is obtained each time the $SCAN facility is invoked. This includes the initial $SCAN call as well as each recursive $SCAN call. The SCWA is used as a general work area for $SCAN, a back-up work area and a display work area. The backup work area is used to hold the contents of an area of storage that is being altered by a set request to $SCAN. The display work area is used to hold the display test 'units' that are created in response to a display request.

B. The macro $SCANTAB is $SCAN'S table macro (i.e., GETAB specific macro). This macro generates the information $SCAN uses to process the input passed to it. The $SCANTAB entries are used to define the start of a user table ($SCANTAB TABLE=USER) or JES table ($SCANTAB TABLE=HASP) and the end of a table ($SCANTAB TABLE=END). Each data table entry defines:

1. a keyword allowed in the statement input
2. how to find the correct control block and field(s) related to the keyword
3. what the allowed input can be
4. how to convert the input for storing into the field(s) or convert the contents of the fields for display.

The operands of the $SCANTAB that achieve the above definitions are as follows:

TABLE=specifies the start or end of a scan table.
NAME=specifies a name of the scan table entry that indicates the scan keyword being defined.
CONV=specifies the conversion to be done (and defines the valid input) when the keyword defined by NAME= is encountered during a scan.
CB=specifies one of the primitive control blocks known by $SCAN as the control block containing the fields representing the value of the keyword, or as the starting point for a control block search for that field.
CBIND=specifies how to find the control block required for this keyword, if the primitive control block is not it. The search starts from the primitive control block address, and performs a series of operations of fields within each control block along the way. The fields used are defined by the first and second operands and the operation is defined by the third operand in each of a set of operand triplets defined to CBIND=.

SUBSCRP=specifies an allowable subscript range for the input specifying this keyword. If SUBSCRP is specified the allowable input forms for $SCAN are 'keyword(subscript)' and 'keywordsubscript'. SUBSCRP is specified as a list of 2, 3 or 4 values, with the first being the lowest allowed subscript value and the second being the highest allowed value. The first and second operands must be numeric values with one exception; single character alphanumeric subscripts can be used, with 'A' corresponding to value X'C1', '4' to value X'F4', etc. The optional third value specifies an index value optionally used during the search for the control block for this keyword. After (by default) or during the CBIND processing in that search, the subscript value is used to index into the current control block to find the correct sub-block for the keyword. The lowest subscript is assumed to correspond to the 0the sub-block and the length of each sub-block is defined by the third positional value of SUBSCRP. The optional fourth value specifies that the "high" and "low" values are to be used as offset values in the MCT or UCT control tables.

FIELD=specifies the name and length of the field associated with the keyword value in the specified control block. The field must be within the DSECT specified by DSECT=, or must be an absolute offset if DSECT=0 is specified. The length is defined by the second positional parameter, and defaults to the assembler-defined length of the field label.

DSECT=specifies the DSECT name required to resolve the field specified by FIELD=in the control block found by the $SCAN search.

RANGE=specifies the allowed range for the input.

VALUE=specifies the allowed specific values a keyword may have. VALUE is used to limit input to only certain values, instead of using RANGE to limit the input to a range of values. For CONV=FLAG keywords, VALUE is specified as a list making up a set of triplets of input, that is VALUE=(a1,b1,c1,a2,b2,c2, ... ). For each set of three operands, as shown, the first (a) is allowed value the keyword may have, the second (b) is a flag byte setting to 'or' on in the FIELD if the keyword is given this value, and the third (c) is a flag bytes setting to 'and' off in the FIELD.

CALLERS=specifies the identification of one or more caller (in a parenthesized list) for which this scan able entry is to be used. If CALLERS is not specified, the table entry is used for any $SCAN caller. This operand is useful, for example, when a scan table is to be used for multiple parameter statement purposes and not all keywords are valid in every case. Note that $SCAN supports multiple entries specified in a scan table for the same NAME=keyword with different CALLERS=specification.

PRESCAN=specifies the name of a routine to be entered just after determining the parameter input contains this keyword and before scanning the input any further.

PSTSCAN=specifies the name of a routine to be entered after all scanning (including possible subscanning) is done for this keyword.

SCANTAB=specifies another scan table(s) or table entry required when scanning this keyword.

VCOUNT=specifies the number of vector elements this scan table entry defines. It allows a single scan entry to define multiple elements of a vector, with the associated fields for the elements being FIELD, FIELD plus the field length, FIELD plus twice the field length, etc. An optional second positional parameter of IGNORE in VCOUNT indicates that null input for vector elements is allowed and the associated fields should not be changed in any way.

OBS=specifies whether the keyword specified for NAME=is to be considered obsolete.

MINLEN=specifies the minimum character length of the keyword defined by this $SCANTAB entry that may be used to reference the keyword in the parameter input.

MSGID=specifies the 3-digit message ID for the $HASPnnn message identifier that is used when a SCAN=DISPLAY includes a display line in a $SCAN call. This message ID is ignored by $SCAN except at the highest level of scanning.

$SCAN EXECUTABLE MACROS

The $SCAN facility and related routines are invoked via four executable macros.

1. $SCAN This functional routine macro is used to invoke the $SCAN facility. The operands on this macro call are:

SCAN=specifies either a scan of a parameter statement specifying values to be scanned and placed in control blocks, or a scan of a parameter statement requesting display of the values associated with specified keywords.

TABLES=specifies the address of a two-word area (table pair) containing the addresses of two scan tables.

CALLER=specifies a caller id for use during the scan. When CALLER is specified, only the scan data table ($SCANTAB) entries having this caller id specified for their CALLER=keyword and those entries not specifying CALLER=are the entries that are used in the scan.

PARM=specifies the address of the parameter statement that is to be scanned.

PARMLEN=specifies the length (that is, the length plus 1) of the parameter statement specified for the PARM=operand.

DISPOUT=specifies the address of the output area where the display lines are placed for the routine specified by DISPRTN.

DISPLEN=specifies the length of the output area specified for the DISPOUT=operand.

DISPRTN=specifies the address of the routine to be invoked to display the scan results.

CBADDR=specifies the oldest parent control block. If CBADDR is specified $SCAN does not search for a control block for this level of scanning. However, $SCAN does perform whatever scanning or indexing that is requested by $SCANTAB using this specified control block.

2. $SCANB This macro is used to backup a copy of a storage area before it is possibly changed during execution of the $SCAN facility. $SCANB may be used only within a pre-scan or post-scan exit routine specified via the PRESCAN and PSTSCAN operands of the $SCANTAB macro. The $SCAN facility uses $SCANB to backup all control block fields before they are changed. If, at any time during the scan, an error is found, $SCAN uses the backups created by $SCANB to restore all the changed fields to their contents prior to the start of the scan. If a $SCAN pre-scan or post-scan exit routine changes a storage area, it should backup that area using the $SCANB macro. The operands of this macro are:

SCWA = specifies the address of the current scan work area, mapped by the $SCANWA macro.

ADDR = specifies the address of the storage area to backup before the scan possibly changes it.

LENGTH = specifies the length (in bytes) of the storage area indicated by the ADDR operand.

TYPE = specifies that an area of storage is to be used following a SET and DISPLAY $SCAN request or if an error occurs within a $SCAN call.

3. $SCANCOM Use the $SCANCOM macro to search for and locate the first non-blank, non-comment character in a specified text string. This facility allows the $SCAN facility to ignore (skip over) comment text provided in both initialization statements and commands. The operands for this macro are:

TEXTBEG = specifies the address of the beginning of the text that is to be scanned by the $SCAN facility.

TEXTEND = specifies the address of the end of the text that is to be scanned by the $SCAN facility.

4. $SCAND Use the $SCAND macro instruction to call the display service exit routines called by the $SCAN facility to add test to a display line being created by the SCAN = DISPLAY request. The operands for this macro are:

SCWA = specifies the address of the current scan work area.

TEXT = specifies the text (specified in single quotes) to be added to the display line or the address of the text to be specified.

LENGTH = specifies the length of the text to be added.

BRKOPT = specifies that the text specified by the TEXT = operand will be separated (YES) or not separated (N)) from the text already passed.

DEBLANK = specifies whether (YES) or not (NO) the blanks and X'OO's are to be removed from the front and end of the text.

$DTEDYN IETDF $DTEDYN is a simple IETDF for centralized subtask management in JES. The $DTEDYN IETDF allows the developer and users to manage JES subtasks in a uniform manner. This includes services for subtask attach, detach, and control block management. The primary control block used in JES main task to subtask communication is the daughter task element (DTE). All subtasks are assigned a DTE when they are attached by the $DYEDYN functional routine.

Subtasks are used in JES processing to perform system functions that might incur an MVS WAIT on the JES main task.

JES has eight different types of subtasks that are managed with the $DTEDYN IETDF. Note that regardless of the particular function a subtask performs, the $DTEDYN IETDF is used to attach and detach the subtask from the JES main task and manage that subtasks' DTE. The following is an example of a JES subtask and its' function. Input/Output to a system data set such as SYS1.PROCLIB can cause a task to wait for I/O completion. The HASPCNVT subtask is used in JES to do all I/O from SYS1.PROCLIB. This allows the JES main task to continue other type of processing while the HASPCNVT subtask does its' I/O and sometimes waits.

$DTEDYN ROUTINE PROCESSING GOVERNED BY TABLE INPUT

The $DTEDYN IETDF controls subtask attach-/detach and DTE control block management. The functional routine macro is named $DTEDYN. The functional routine for the $DTEDYN IETDF is logically separated into two routines, one for attach processing and one for detach processing. These functional routines are named $DTEDYNA and $DTEDYND respectively. The two functional routines for the $DTEDYN IETDF are both called via the $DTEDYN functional routine macro.

The $DTEDYN IETDF contains a table macro named $DTETAB that is used to build the data tables. The keyword parameters on $DTETAB are used to set data constants in the $DTEDYN tables. Each of these parameters is used by the $DTEDYN functional routines to make basic logic decisions on the characteristics of each subtask.

$DTEDYN TABLE STRUCTURE

The table structure for the $DTEDYN IETDF is as follows. The JES global control block is the HASP Communication Table (HCT). The HCT contains a pointer (MCT) to the Master Control Table (MCT) that is the developer-supplied router control block. The MCT contains a table pair pointer for the $DTEDYN IETDF. The first word of the table pair pointer is named MCTDTETU and is used to contain the address of the user-defined table (if any). The second word of the table pair pointer is named MCTDTETH and is used to contain the address of the developer-supplied table which resides in the HASPTABS module.

The $DTEDYN IETDF is a simple IETDF because there is only one level of data tables. The $DTEDYN IETDF is implemented such that there is one user-defined table and one developer-supplied table.

$DTEDYN TABLE AND MAPPING MACROS

The $DTEDYN IETDF table macro is called $DTETAB. This macro is used to build both developer-supplied tables and user-defined tables. These tables contain the information (data) with which $DTEDYNA and $DTEDYND base their major logic decisions upon. $DTETAB contains the following keyword parameters:

NAME = specifies the subtask name the HASP messages use to identify the subtask to the operator.

ID = specifies the subtask identifier used to uniquely distinguish the different types of subtasks.

EPNAME = specifies the entry point name used by $DTEDYNA for the MVS IDENTIFY macro call.

EPLOC = specifies the offset into the specified control block and, optionally, the control block name from which the entry point address is obtained. The control block name defaults to either MODMAP (if this macro is used to build a developer-supplied DTE table) or UCT (if this macro is used to build a user-defined DTE table).

HEAD = specifies the offset and control block name of the subtask type chain head. The control block name defaults to either HCT (if this macro is used to build an developer-supplied DTE table) or UCT (if this macro is used to build a user-defined DTE table).

WORKLEN=specifies the length of the subtask work area extension. If specified, this length is added to the DTE length (DTELEN) when $DTEDYNA obtains DTE storage.

GEN=specifies whether or not the subtask is to be automatically attached during JES initialization processing.

STAE=specifies whether or not the subtask is detached with STAE specified on the MVS DETACH macro.

SZERO=specifies whether or not the subtask obtains storage from the attaching tasks' subpool 0 or is allocated its' own subpool 0.

TABLE=specifies either the beginning or the end of a developer-supplied or user-defined DTE table. It is this keyword that builds the table header and footer for the $DTEDYN IETDF tables.

$DTEDYN EXECUTABLE MACRO

The $DTEDYN functional routine macro is an executable macro used to invoke the attached and detach subtask management services.

The first positional parameter of $DTEDYN specifies whether to call $DTEDYNA (attach) or $DTEDYND (detach) service routine.

ATTACH—informs $DTEDYNA to obtain and initialize a new DTE and to attach the subtask for the caller.

DETACH—informs $DTEDYND to free the DTE and to detach the subtask.

WAIT=specifies whether $DTEDYN processing should wait for subtask initialization and/or termination.

ATTACH

ECB—indicates that $DTEDYNA should wait for the subtask to post the initialization ECB.

XECB—indicates that $DTEDYNA should $WAIT (XECB style) for the subtask to post the initialization ECB.

NO—indicates that $DTEDYNA is not to wait.

DETACH

ECB—indicates that $DTEDYND should wait for MVS to post the subtask termination ECB.

XECB—indicates that $DTEDYND should $WAIT (XECB style) for MVS to post the termination ECB.

NO—indicates that $DTEDYND is not to wait.

PARM=specifies a fullword parameter to be passed to the subtask during attach processing.

ID=specifies the subtask identifier used to uniquely distinguish the different types of subtasks.

DTE=specifies the address of the DTE to be freed by $DTEDYND.

PROCESSOR CONTROL ELEMENT IETDF

A processor control element (PCE) is the main JES dispatchable unit within the JES address space. There is one PCE type for each unique function which is performed by JES under the main task in the JES address space. There is now an IETDF for processor control elements (PCEs) that provides for specific initialization doe, mainline code and termination code for each unique PCE type. This PCE IETDF relies on the table pair structure (described above) to define developer-supplied PCEs and allow users to modify or create their own unique PCEs. The PCE IETDF contains the developer-supplied definitions of all the JES dispatchable units and allows users to define and modify their own dispatchable units. The functional routines ($PCEDYNA and $PCEDYND), the functional routine macro ($PCEDYN), and a table macro ($PCETAB) use the normal router control block structure and the table pairs structure described above. (PCEs are to the JES subsystem what task control blocks (TCBs) are to the MVS operating system.)

While the invention has been particularly shown and described with references to preferred embodiments thereof, it will be understood by those skilled in the art that the foregoing and other changes in form and details may be made therein without departing from the spirit and scope of the invention.

What is claimed is:

1. In a data processing system having a memory and an operating system that includes an operating system component stored in an address space of said memory and having internal structures, and at least one installation extendable table driven facility in said address space that has access to a primary control block, a data structure within said operating system component and used for modifying said operating system, said data structure comprising:

table pair pointers in which a first table pair pointer points to a first table of data and a second table pair pointer points to a second table of data; and means for referencing data contained in predetermined table entries in said first and second tables of data operated on by said installation extendable table driven facility by reference through said primary control block for modifying said operating system component by directly altering the internal structures of said operating system component through the use of a macro in accordance with the data from at least one of said table entries.

2. The data processing system of claim 1 in which said internal structures are control blocks and that portion of the operating system which references said control blocks.

3. The data processing system of claim 1 in which said first table pair pointer is a first word of a double word table pair pointer and said second table pair pointer is a second word of said double word table pair pointer.

4. In a data processing system in which an operating system includes an operating system component having internal structures and at least one installation extendable table driven facility that has access to a primary control block, a method for modifying said operating system using an installation extendable table driven facility, said method comprising the steps of:

accessing a table structure within said operating system component that contains table pair pointers in which a first table pair pointer points to a first table of data and a second table pair pointer points to a second table of data; and employing either of said first and second tables of data accessed during and by means of the execution of said installation extendable table driven facility, which operates, by reference through said primary control block, on data contained in predetermined table entries in said first or second tables of data, to modify said operating system component by directly altering the internal structures of said operating system component through the use of a macro in accordance with data from at least one said table entries.

5. The method of claim 4 in which said internal structures are control blocks and that portion of the operating system which references said control blocks.

6. The method of claim 4 in which said first table pair pointer is a first word of a double word table pair pointer and said second table pair pointer is a second word of said double word table pair pointer.

7. The method of claim 4 in which said table structure includes first and second router control blocks that contain said table pair pointers.

8. The method of claim 7 in which said first table of data is a user-created table and said second table of data is a developer-created table.

9. The method of claim 8 in which an instruction, in code generated by a macro, branches to said installation extendable table driven facility, said macro also passing a table entry identifier to said installation extendable table driven facility which uses data in said first or second table of data at a table entry identified by said table entry identifier for providing a function to said at least one operating system component.

10. The method of claim 9 in which said first and second table pair pointer points to one of said tables of data which contains data in a table entry identified by said table entry identifier.

11. The method of claim 10 in which said installation extendable table driven facility attempts to locate said table entry identified by said table entry identifier in said user-created table before attempting to locate said table entry identified by said table entry identifier in said developer-created table, thereby permitting modification or alteration of execution of said operating system without directly modifying, changing or adding to the operating system and without the use of exit routines.

12. The method of claim 11 in which said user-created table is given priority over a corresponding developer-supplied table.

* * * * *